(12) United States Patent
Wong et al.

(10) Patent No.: US 8,151,121 B1
(45) Date of Patent: Apr. 3, 2012

(54) SECURE DATA STORAGE

(75) Inventors: Terrence L. Wong, San Francisco, CA (US); Ian E. Harvey, Lake Forest, CA (US); David C. Lee, Alameda, CA (US); Greg S. Lewis, Berkeley, CA (US); Steven R. Spielman, Oakland, CA (US); Christopher C. Tan, Alameda, CA (US); David K. Warland, Davis, CA (US)

(73) Assignee: LSI Corporation, Milpitas, CA (US)

( * ) Notice: Subject to any disclaimer, the term of this patent is extended or adjusted under 35 U.S.C. 154(b) by 2176 days.

(21) Appl. No.: 10/387,232

(22) Filed: Mar. 11, 2003

(51) Int. Cl.
*G06F 21/00* (2006.01)

(52) U.S. Cl. ...................................................... 713/193
(58) Field of Classification Search ...................... None
See application file for complete search history.

(56) References Cited

U.S. PATENT DOCUMENTS

| | | | | |
|---|---|---|---|---|
| 5,963,909 A * | 10/1999 | Warren et al. | ...................... | 705/1 |
| 6,477,124 B2 * | 11/2002 | Carson | ........................ | 369/53.21 |
| 6,587,948 B1 * | 7/2003 | Inazawa et al. | ................ | 713/193 |

* cited by examiner

*Primary Examiner* — Benjamin Lanier
(74) *Attorney, Agent, or Firm* — Christopher P. Maiorana, PC

(57) ABSTRACT

Securely storing data to an optical disc has been described, including generating write data that includes the data and overhead data that facilitates reading the data from the disc; and configuring the overhead data according to a key.

19 Claims, 7 Drawing Sheets

SECURE DATA STORAGE

FIELD OF THE INVENTION

The present invention relates generally to data storage. More specifically, a data security system that is particularly useful for an optical disc is disclosed.

BACKGROUND OF THE INVENTION

Protection of data stored on various storage media is an increasingly important technical requirement. For example, it is important to movie distributors that digital copies cannot readily be made of DVD's. As the capacity of writeable digital optical storage media and other writable storage media increases and compression techniques improve, making high quality copies of movies distributed on DVD is becoming an increasing threat to the bottom lines of movie distributors.

Currently, DVD copy protection relies on various encryption techniques that have been breached. In fact, there is software available to easily copy DVDs on personal computers today. Studios and distributors have increasingly relied on legal restrictions on copying and reverse engineering of encryption systems to replace the limited technical level of protection achieved by encryption systems. Certainly, it would be helpful if data protection schemes could be engineered to provide better protection of valuable data.

SUMMARY OF THE INVENTION

Securely storing data to an optical disc has been described, including generating write data that includes the data and overhead data that facilitates reading the data from the disc; and configuring the overhead data according to a key.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1A:
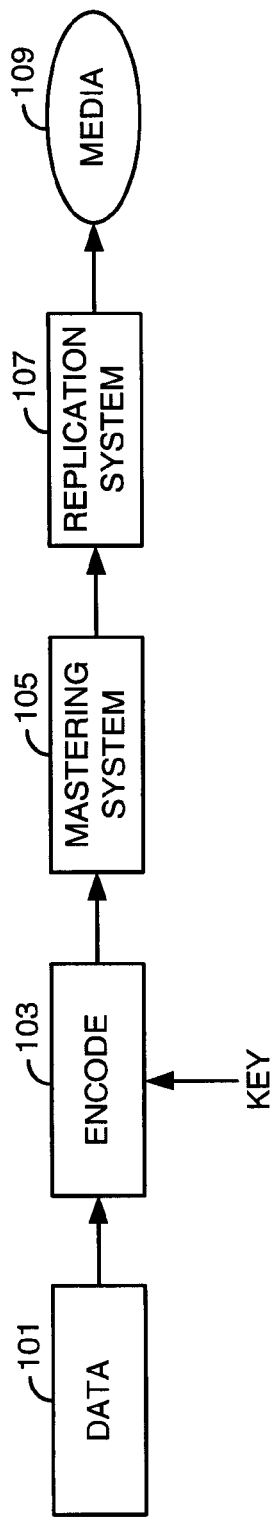
FIG. 1A is a diagram illustrating the writer for a data storage system.

It should be appreciated that the present invention can be implemented in numerous ways, including as a process, an apparatus, a system, or a computer readable medium such as a computer readable storage medium or a computer network wherein program instructions are sent over optical or electronic communication links. For purposes of this specification, a computer includes a general purpose computer or a special purpose device with processing capability such as a disc player. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A data security scheme that prevents data from being read from storage media without using a key is disclosed. In some embodiments, the key is required to generate reading instructions so that recovering digital data, which can be analyzed later by a computer, is prevented without the key. In other embodiments, the key is required to decrypt or decode digital data that is recovered. The scheme has the advantage that security is built into the reading and writing process, in addition to whatever other encryption scheme is implemented independent of the reading and writing process. In different embodiments, the key may either be transmitted separately or stored on the disc in some secure manner such as by watermarking. In some embodiments, a layered security strategy is used in which alternative security schemes or additional security schemes are activated by writing different keys or different key combinations. In some embodiments, it is also possible to reconfigure a given security layer's security scheme. The following three images may help to clarify these layered security concepts:

1) a series of locked boxes, one inside another, each requiring a different key to open it,
2) additional boxes, unlocked for the moment, inside the innermost locked box, and
3) each of the locks on the locked boxes can be changed at a later time.

The data security scheme disclosed herein is particularly useful in an optical data storage system that stores and recovers multiple data levels. However, it should be recognized that many of the techniques described herein are applicable to other data storage systems such as conventional CD and DVD systems that store two levels of data as well as magnetic storage systems and other data storage systems. For the purpose of example, a multiple level optical data storage system is described in detail herein. The format instruction generation and formatting techniques and reading techniques described are equally applicable to other data storage systems.

FIG. 1A is a diagram illustrating the writer for a data storage system. Content data 101—such as a movie, music, or other audio or visual material—is input to encoder 103, which uses a key to specify the security features during the data writing. Encoder 103 outputs writing instructions to the laser of mastering system 105 that creates a master, which is used to mass produce stamped plastic copies of the content data. By placing the master into the replication system 107, high-fidelity replicas can be produced rapidly on media 109 using plastic injection molding machinery.

Figure 1B:
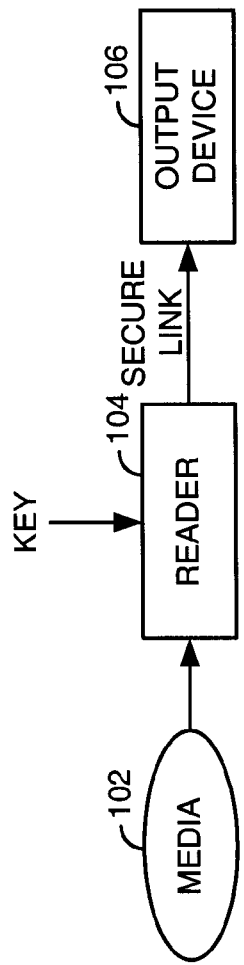
FIG. 1B is a diagram illustrating the player for a data storage system that includes a secure link to an output device.

FIG. 1B is a diagram illustrating the player for a data storage system that includes a secure link to an output device. One such secure link is the High Definition Multimedia Interface (HDMI), which enables the secure distribution of uncompressed high-definition video and multi-channel audio in a single cable and is available from HDMI Licensing, LLC, 1060 E. Argues Avenue, Suite 100, Sunnyvale, Calif. 94085, USA. Media 102 is read by a reader 104. Reader 104 uses a key that is obtained either from the media in a secure manner or from another source. Using the key, the reader reads the data and transmits display information to output device 106 via the secure data link. So long as the data link is secure, copying of the data is prevented.

Conventional systems have used cryptographic techniques to encrypt data on a DVD that can be read by a DVD player but not interpreted and displayed without decryption. A more secure system can be realized if the data is protected not only by encryption, but also by controlled changes in the format of the data written to a storage medium. In other words, by having different formats for the data on the disk based on a key.

Figure 2A:
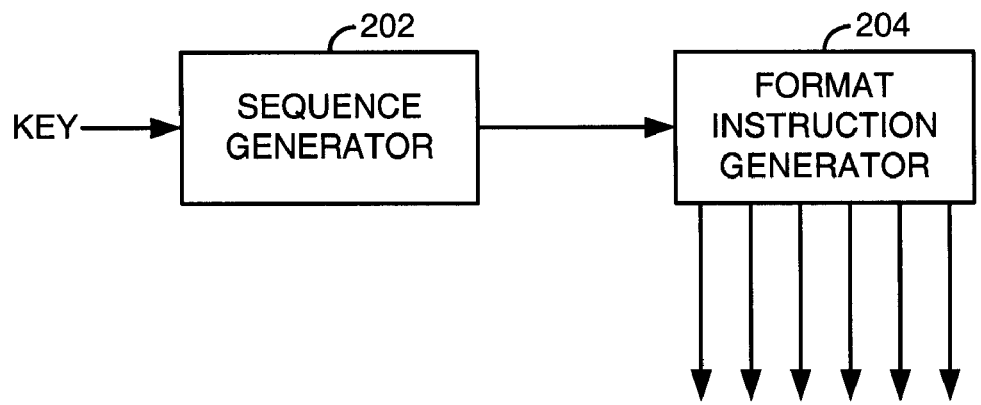
FIG. 2A is a diagram illustrating how formatting instructions are generated from a key in one embodiment.

FIG. 2A is a diagram illustrating how formatting instructions are generated from a key in one embodiment. The key is input to sequence generator 202. In one embodiment, the key is a seed and the sequence generator is a pseudorandom number generator. The pseudorandom number generator creates a key-dependent sequence of numbers that appears random (preferably with no correlations in its sequence for all the numbers of the sequence required for writing data to one disc). The sequence of numbers is converted to a sequence of instructions by format instruction generator 204. Format instruction generator 204 generates format instructions that control one or more aspects of the data writing process as is described below. If more than one aspect of the data writing process is being controlled by format instruction generator 204, then the sequence of numbers may be split up in an appropriate manner so that different parts of the sequence are used to control different aspects of the data writing process. Controlling a given aspect of the data writing process may require setting parameters frequently or rarely. Also, it may require setting parameters in a regular or irregular pattern within the format on the disc. In different embodiments, more than one key may be required to provide the seed and more than one pseudorandom number generator may be used to generate instructions. In other embodiments, the key encodes a predetermined sequence using a block encoding scheme to produce a sequence of instructions for the writing process.

Figure 2B:
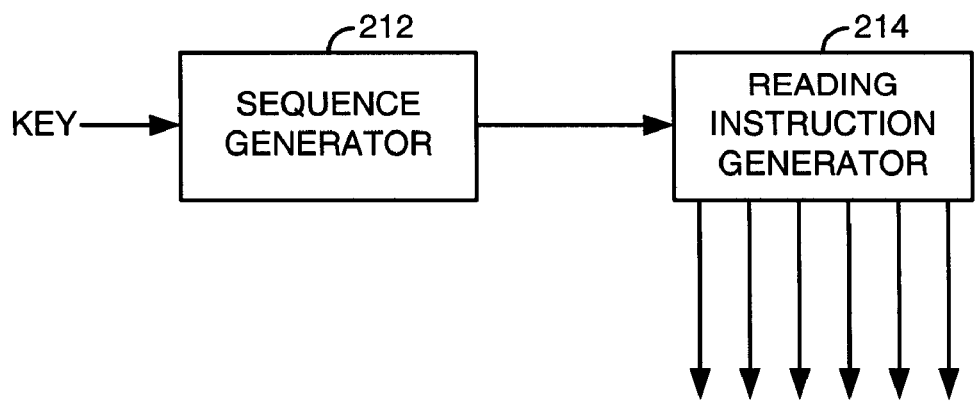
FIG. 2B is a diagram illustrating how reading instructions are generated from a key in a reader.

FIG. 2B is a diagram illustrating how reading instructions are generated from a key in a reader. The process corresponds directly to the process for generating format instructions. A key is input to sequence generator 212, which generates a numerical sequence, and reading instruction generator 214 converts the sequence to reading instructions that are required by the reading system. The reading instructions correspond to the formatting instructions generated to write the disc. That is, the reading instructions enable the reader to read a disc written using the same key. In other embodiments, the reading instructions for the reader require using a different key or different generator than required for writing. The type of instructions required are described below.

The key may be transmitted to the reader by a number of appropriate secure or not secure techniques. In some embodiments, the key is securely stored on the optical disc using a watermarking technique. For example, the key may be encoded by adding a pattern of small amplitude signals (close to the noise level of the system) to written data, which requires that averaging over many instances of this pattern in order to extract the correct key from this pattern. The key may also be separately delivered over another channel such as the Internet or phone line. The key may also be stored in a separate area of the disc. The key may also be stored in a chip in the reading system or otherwise known to the system.

Figure 3:
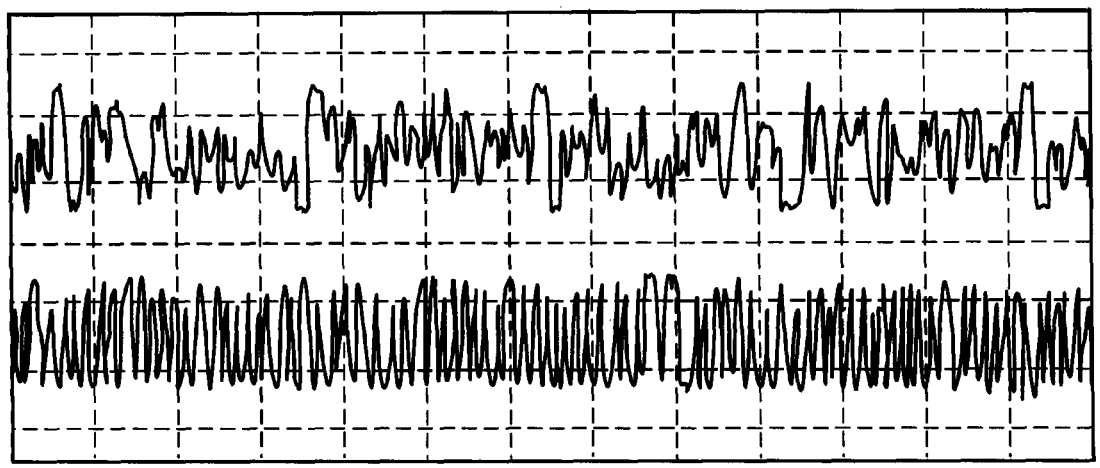
FIG. 3 is a diagram comparing a raw signal read from a conventional optical disc with a signal read from a multilevel optical disc.

FIG. 3 is a diagram comparing a raw signal read from a conventional optical disc with a signal read from a multilevel optical disc. This illustrates the possibilities for altering the format of a multilevel optical reader's signal, some of which are described below for the multilevel system. Similar format elements could be changed in an analogous way for the conventional binary systems. For example, synchronization marks could be changed or moved, modulation patterns could be shifted, etc.

For the standard conventional optical data storage signal, saturation recording is implemented so that the signal is expected to transition between only a high state and a low state. Recovering the encoded data is a matter of detecting the timing of the transitions between the two states. The encoded data may further be encrypted, but the encoded data can generally be initially recovered and stored in a computer by a reader without detailed formatting information. Once the encoded data is stored in a computer, it can be analyzed in an attempt to break the encryption.

The multilevel signal is more complex than the conventional signal. Instead of alternating between two levels, multiple levels are encoded. Accurately recovering digital data from such a signal requires special formatting written into the signal and the ability to utilize the formatting on the read side to read the signal. For example, calibration marks are used to determine level amplitudes and filtering requirements. The reading system uses timing recovery and gain control marks interspersed in the signal. DC control marks are added and known sequences are included to provide training of an adaptive equalizer. Changing, or moving, these marks without knowing the changes to the marks, or the new locations of the marks, would cause important data decoding, calibration, timing recovery, and detection subsystems to fail. These and other aspects of a multilevel system described below can be varied and controlled using one or more keys. Without the key, these formatting issues would have to be overcome before the data could be prepared for cryptographic analysis. In addition, without the key and generator the data cannot be easily written to a disc. Thus, making a compatibly written disc to this system would be very difficult.

As mentioned, it should be noted that the key formatting technique described herein may also be used in a conventional optical storage system or other data storage system. The multilevel optical data storage system has the advantage that the inherent complexity of data formatting and recovery in such a system particularly lends itself to controlled variation by a key.

The keys will control how the player's various components read data from the disc and how the writer's various components write information to the disc. A typical data format on a disc is described next and then the components of the reader and writer that process the data are described. The format instruction generator and the reading instruction generator provide instructions to those components based on the keys so that the keys are required to read the data from the disc.

Figure 4A:
FIG. 4A is a diagram illustrating a typical data format used in a multilevel system.

FIG. 4A is a diagram illustrating a typical data format used in a multilevel system. A link in portion 402 provides extra space to help avoid data blocks overlapping. The link in portion is generally not required in a ROM system, but is useful in certain writable systems. A preamble 404 includes marks written for the purpose of synchronization, addressing, equalization, and calibration. A typical preamble is shown in greater detail in FIG. 4B. A data area 406 includes data along with other marks such as timing and gain control marks, DC control marks, and trellis closeout marks for the purpose of putting a Viterbi detector in a known state in embodiments where a trellis code is used. A typical data area is shown in more detail in FIG. 4C. A postamble 408 includes additional marks as desired and link out portion 410 performs a similar function as link in portion 402 in writable systems where link in and link out portions are used.

Figure 4B:
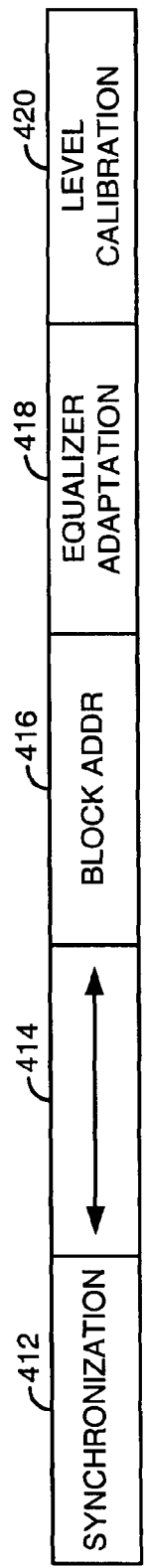
FIG. 4B is a diagram illustrating a typical preamble.

FIG. 4B is a diagram illustrating a typical preamble. Synchronization pattern 412 is used to identify the beginning of the data that is to be read. "Data" may include overhead data used to facilitate reading and writing, as well as payload data which is the data that is stored on and recovered from the device. In the case of error correction coding, the overhead data is mixed in with the payload data. Other overhead data is segregated to facilitate its performance of a certain function. In the example shown, the first data read is the block address 416, which is part of the control data. The size of offset area 414 determines the location of the beginning of the block address relative to the synchronization pattern. Block address 416 is the address of the data block and is used to access the data and reassemble files from blocks.

Equalizer adaptation area 418 contains a written pattern that allows the equalizer to compensate for the unique interaction of the specific media being read with the reader under whatever environmental or optomechanical conditions are present. In some embodiments, the equalizer adaptation area contains a known sequence that is read and the expected value of the read signal is compared to the actual value of the read signal. The differences between expected and actual values are used to tune the equalizer to achieve a good result. Level calibration area 420 provides a pattern of data that is used to calibrate the reader's signal processing system with the levels which have been written to the disc.

Figure 4C:
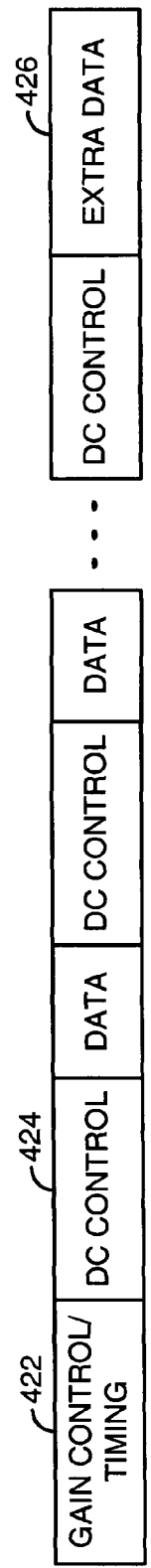
FIG. 4C is a diagram illustrating the format of a portion of a data block.

FIG. 4C is a diagram illustrating the format of a portion of a data block. Timing and gain control area 422 provides levels that enable a timing signal to be recovered and the gain to be adjusted. DC control area 424 provides a sequence of numbers that are written to prevent the read signal from having a DC component. DC control areas are interspersed with data areas so that DC components are canceled in a timely manner. Extra marks that may be discarded 426 are included somewhere within the block in some embodiments.

Figure 5A:
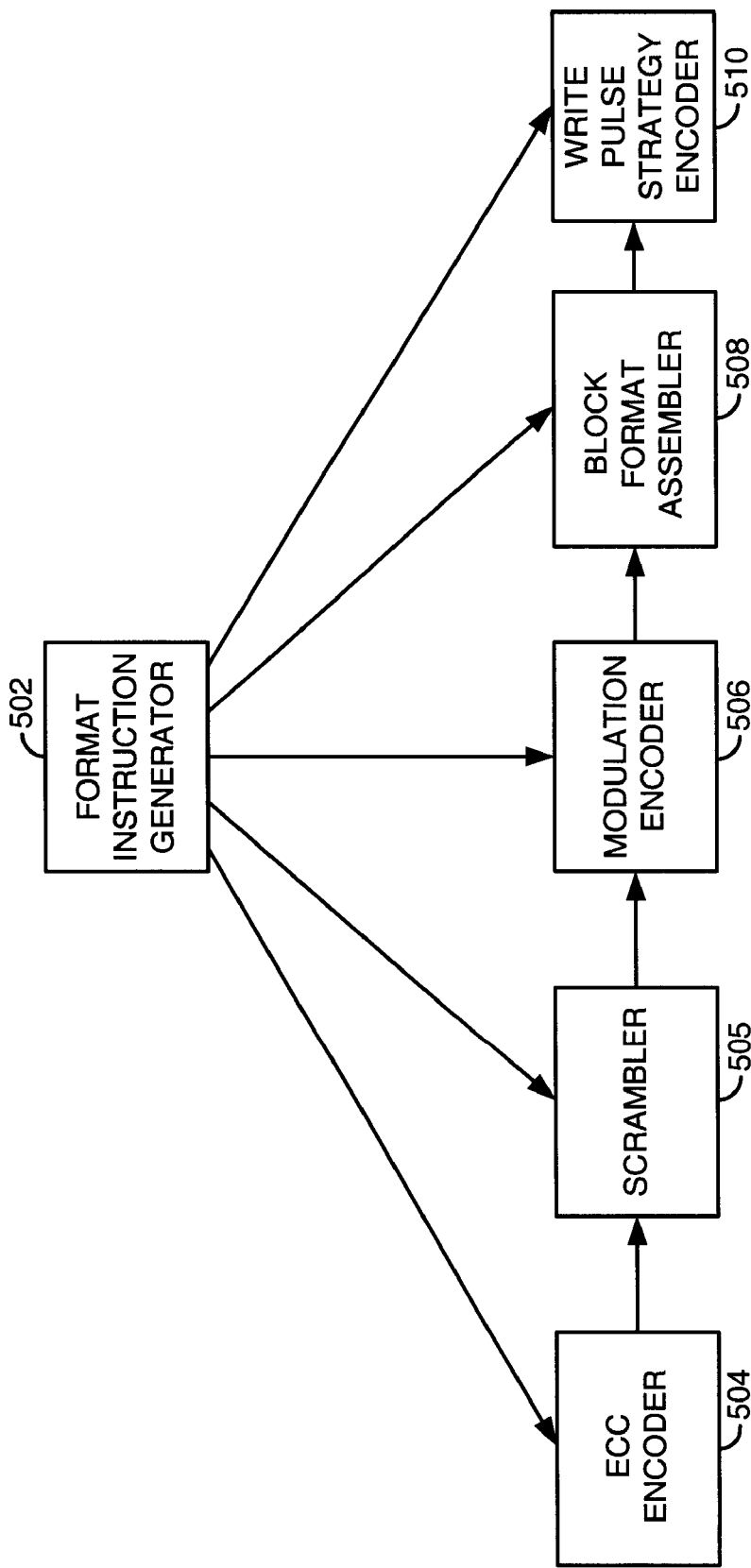
FIG. 5A is a diagram illustrating the interaction of the format instruction generator with components of a write system.

FIG. 5A is a diagram illustrating the interaction of the format instruction generator with components of a write system. Format instructions from format instruction generator 502 are directed to error correction code (ECC) encoder 504, scrambler 505, modulation encoder 506, block format assembler 508, and write pulse strategy encoder 510.

Figure 5B:
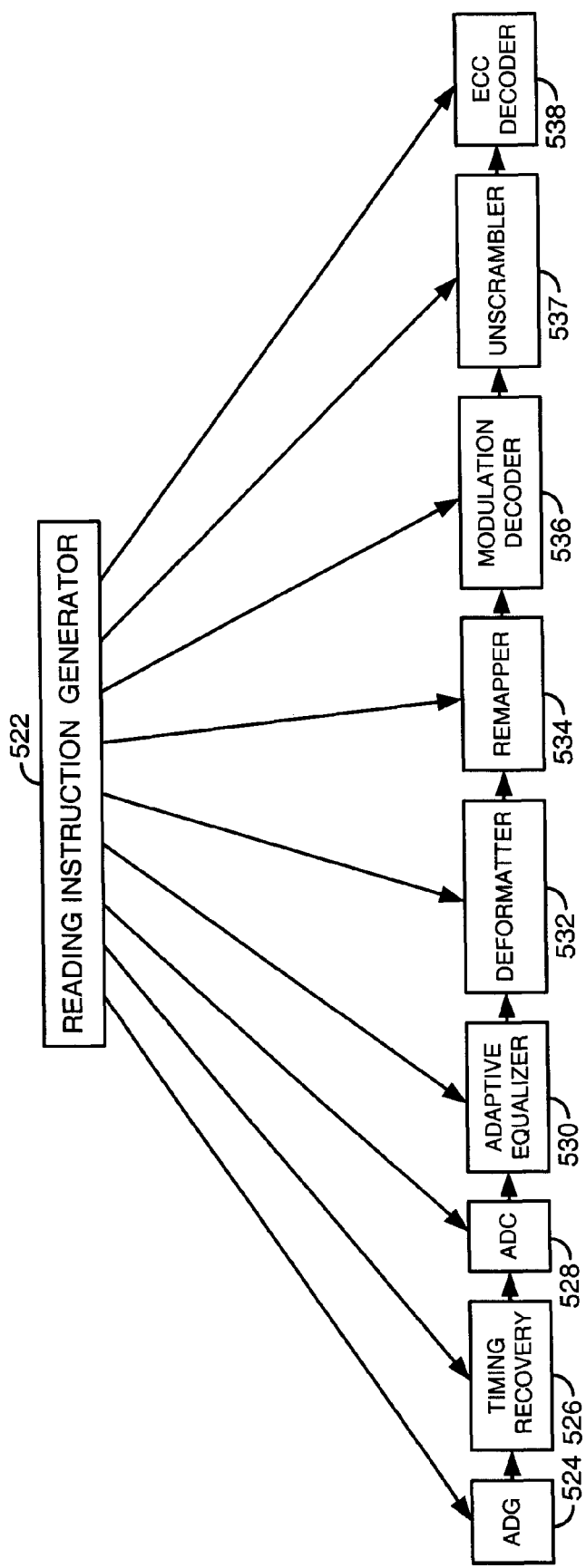
FIG. 5B is a diagram illustrating the interaction of the reading instruction generator with components of the read system.

FIG. 5B is a diagram illustrating the interaction of the reading instruction generator with components of the read system. Reading instruction generator 522 provides instructions to automatic gain control 524, timing recovery 526, analog to digital converter 528, adaptive equalizer 530, deformatter 532, remapper 534, modulation decoder 536, unscrambler 537 and ECC decoder 538.

In various embodiments, the format instruction generator and the reading instruction generator alter the reading and writing process based on the key in the ways enumerated below. Each variation in the read/write process may be used individually or in combination with other variations. It should also be noted that most techniques below provide the security feature by reusing existing format marks and not adding additional marks. This is important to maintaining cost effectiveness and high storage densities.

1. Synchronization

The offset between the synchronization pattern and the remainder of the data is controlled by a sequence output from the format instruction generator to the block format assembler. The reading instruction generator outputs the required sequence to the timing recovery block. If the offset is not known by the reader, then the beginning of data must be derived by some other means. In addition, the synchronization pattern is varied in some embodiments based on instructions from the format instruction generator and the pattern is determined by the reader based on instructions from the reading instruction generator.

2. Equalization

In some embodiments, equalization adaptation depends on reading a known sequence and determining the difference between the expected read signal from that sequence and the actual read signal. The format instruction generator provides instructions to the block format assembler that determine the equalization sequence. The reading instruction generator provides corresponding instructions to the adaptive equalizer so that the adaptive equalizer can determine the correct expected read signal. Without the correct information provided by the reading instruction generator using the key, the adaptive equalizer cannot take advantage of the known pattern.

3. Level Calibration.

In some embodiments, a specific sequence of marks is written for the purpose of adjusting thresholds for the data levels detected. The sequence written is varied according to instructions received from the format instruction generator. The reading instruction generator provides the sequences to the level remapper which calibrates the levels on the read side. Without this information, level calibration is made more difficult. In another embodiment, all, or some, of the level calibration information could be offset, or scaled, from the true levels of the data during writing. This offset, scaling, and proper masking of level calibration information would be conveyed by the reading instruction generator to the reading calibration hardware so that the hardware could remove the effects of these changes.

4. Timing and AGC

The timing and AGC sequences and their positions are varied according to instructions generated by the format instruction generator. Changing the levels used in the AGC sequence will disrupt gain control processing if that change is not known. Similarly, the positions of timing sequences can be shifted to disrupt timing recovery. The reading instruction generator provides that information to the AGC and timing recovery blocks in the reader so that timing recovery and AGC can proceed using the variable format timing and AGC sequences.

5. DC control

The format of DC control blocks varies in different embodiments. One particularly efficient implementation of DC control uses bits that either invert or do not invert portions of the data being written to keep the DC level near zero. The location and coding of the DC control bits is varied according to instructions from the format instruction generator. Without knowledge of the format and content of the DC control bits, interpretation of the recovered data is hindered. The reading instruction generator provides this information to the deformatter in the reader.

6. Extra Marks

The positions of data marks are shifted by inserting extra marks. The amount and location of extra marks within the block is controlled by the format instruction generator and the reading instruction generator provides instructions to the deformatter on the reader so that the extra data can be identified and handled appropriately.

7. Modulation Coding

The modulation coding process is also varied according to instructions from the format instruction generator. The reading instruction generator provides information to the modulation decoder so as to facilitate proper decoding of the data.

8. Scrambling

In some embodiments, data is scrambled between the modulation coding and ECC coding. The format instruction generator provides instructions that control the scrambling and the reading instruction generator provides the corresponding instructions for descrambling using the key.

9. Error Correction Coding

In some embodiments, the format instruction generator also sends instructions to the ECC encoder. Block scrambling in the ECC and nonzero seeds for the ECC syndrome used in some embodiments may be varied according to instructions from the format instruction generator. On the read side, corresponding instructions are provided by the reading instruction generator.

10. Write Strategy

In some embodiments, the format instruction generator sends instructions to the write pulse strategy encoder to vary the write pulse strategy for all marks or selected marks. For example, the levels may be altered for selected marks.

Thus, numerous aspects of the write process are varied and controlled in different embodiments by the format instruction generator. By doing so, the recovery of encrypted data that may be analyzed and decrypted by a computer is greatly hindered. The techniques described above include techniques for altering data format, location, and specific sequences relied upon by read processes to recover data.

Figure 6:
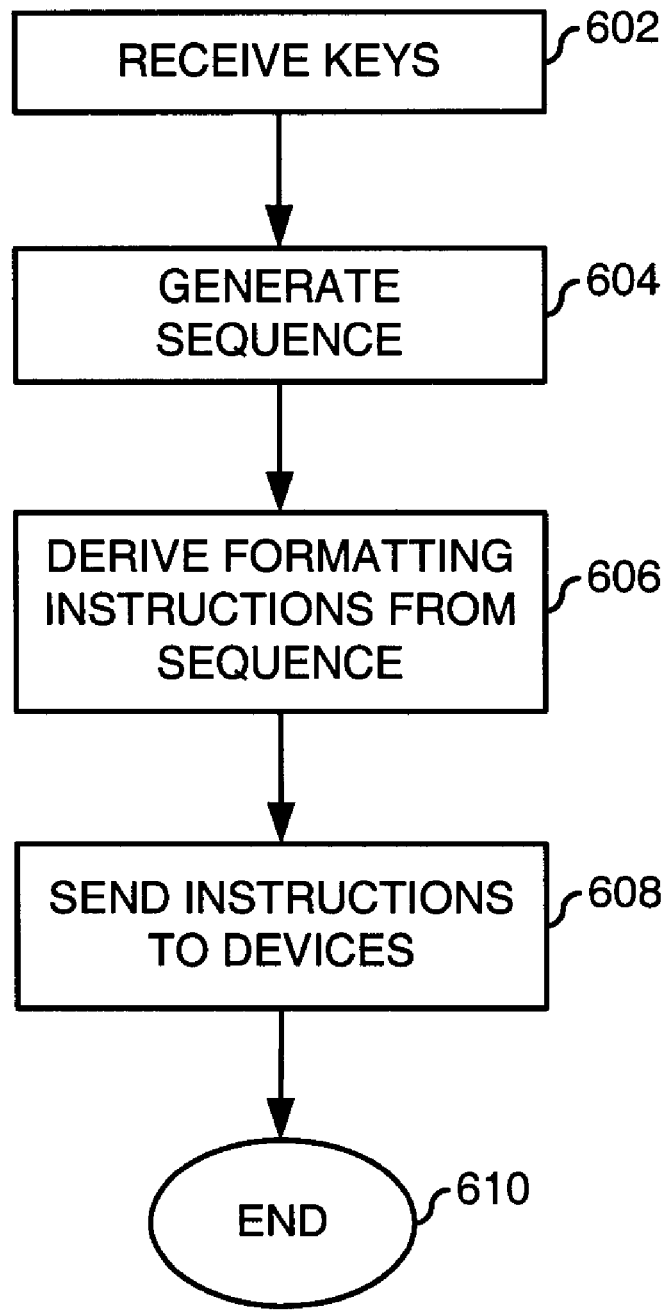
FIG. 6 is a flow chart illustrating a process executed by the format instruction generator for generating instructions.

FIG. 6 is a flow chart illustrating a process executed by the format instruction generator for generating instructions. A key is, or multiple keys are, received in step 602. The key is then used to generate a sequence in step 604. In some embodiments, a pseudorandom number generator is used to generate the sequence. In step 606, formatting instructions are derived from the sequence. The formatting instructions may include offsets that change the location of data, numbers used to select from available data sequences to be written for a purpose such as gain control or equalization adaptation, numbers used to select among various encoding schemes, or any other instructions that vary the manner in which data is written to or read from the disc. The formatting instructions may be generated by separating a main sequence derived from the key into subsequences used for different purposes or reusing parts of the main sequence. In some embodiments, multiple sequences are generated from different pseudorandom number generators from the same key. The key itself may select the generator to be used from a plurality of available generators or to configure the generator. Multiple keys are also used in some embodiments.

In step 608 the instructions are sent to the appropriate devices on the write or read side. The process ends at 610. A corresponding process is executed on the read side by the reading instruction generator to generate corresponding instructions for the components on the read side that require information about the writing process controlled by the format instruction generator.

The complexity of the multilevel writing and reading process thus lends itself to many configurations that may be controlled using one or more secret keys. A number of secret keys may be encoded using various watermarking and other key hiding techniques. In some embodiments, certain possible variations of the write process are dormant unless an appropriate key is received. For example, one key may control changing the equalization sequence. If no key is included (or a key indicating a null key is included), then the equalization is not changed and a standard equalization sequence is used. Over time, as progress is made by parties attempting to break the security of the disc, previously unactivated features may be activated by simply using the appropriate key. In some embodiments, it is possible to select, alter, or replace components for the security system like the instruction generators or the sequence generators.

The key activation feature is also used with conventional cryptographic schemes. In one embodiment, readers are manufactured having several alternative decrypting engines. Initially keys corresponding to a first engine are used and as the first encryption/decryption method becomes less secure over time, other keys are used that activate independent encryption schemes. Thus, parties attempting to break the security of discs are faced with a series of challenges and new discs can be made with alternative encryption once one version has been broken. In some embodiments, the reader and writer each include a plurality of pseudorandom number generators and different keys activate different generators so that if one is reverse engineered, others may be alternatively used.

An optical disc security system has been disclosed. In some embodiments, the complexity of a multilevel optical storage system is exploited by using a format instruction generator to alter aspects of the writing process based on one or more keys. Certain techniques, such as using alternative keys to activate new security schemes as old ones are compromised are applied to optical as well as other data storage systems using alternative conventional cryptographic protection techniques.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

The invention claimed is:

1. A method of storing data to an optical disc comprising:
generating encoded data that includes a payload data block and overhead data to be stored on the optical disc, wherein the overhead data is (i) used by one or more components of a disc writing system to write the encoded data to the optical disc and (ii) used by one or more components of a disc reading system to read the encoded data from the optical disc using instructions generated based upon a key, wherein the key is a seed to a pseudorandom number generator and it is infeasible to convert an analog read signal recovered from the optical disc into encoded digital data without the key; and
generating the overhead data according to the key.

2. A method of storing data to an optical disc as recited in claim 1 further comprising:
generating one or more formatting instructions based on the key, wherein the formatting instructions control the one or more components of the disc writing system to write the encoded data to the optical disc according to the overhead data.

3. A method of storing data to an optical disc as recited in claim 1 wherein the overhead data is used by one or more reading instructions to control the one or more components of the disc reading system to convert the analog read signal recovered from the optical disc into encoded digital data.

4. A method of storing data to an optical disc as recited in claim 1 wherein the overhead data provides synchronization.

5. A method of storing data to an optical disc as recited in claim 1 wherein equalization is controlled based upon the overhead data.

6. A method of storing data to an optical disc as recited in claim 1 wherein level calibration is controlled based upon the overhead data.

7. A method of storing data to an optical disc as recited in claim 1 wherein automatic gain control is adjusted based upon the overhead data.

8. A method of storing data to an optical disc as recited in claim 1 wherein timing recovery is controlled based upon the overhead data.

9. A method of storing data to an optical disc as recited in claim 1 wherein the overhead data specifies a DC control scheme.

10. A method of storing data to an optical disc as recited in claim 1 wherein the overhead data specifies the location of extra marks inserted to shift a position of one or more data marks.

11. A method of storing data to an optical disc as recited in claim 1 wherein the key is stored on the disc.

12. A method of storing data to an optical disc as recited in claim 1 wherein the key is stored on the disc as a watermark.

13. A method of storing data to an optical disc as recited in claim 1 wherein the key is received via a communication channel.

14. A method of storing data to an optical disc as recited in claim 1 wherein the key is encoded in a wobble groove on the disc.

15. A method of storing data to an optical disc as recited in claim 1 wherein the key specifies a security feature that is selectably activated by the key.

16. A method of storing data to an optical disc as recited in claim 1 wherein the optical disc comprises a multilevel optical data storage system.

17. A method of storing data to an optical disc as recited in claim 1 wherein the data to be written to the optical disc is encrypted.

18. A method of storing data to an optical disc comprising:
generating encoded data that includes a payload data block and overhead data to be stored on the optical disc, wherein the overhead data is (i) used by one or more components of a disc writing system to write the encoded data to the optical disc and (ii) used by one or more components of a disc reading system to read the encoded data from the optical disc using instructions generated based upon a key, wherein it is infeasible to convert an analog read signal recovered from the optical disc into encoded digital data without the key; and
generating the overhead data according to the key, wherein equalization is controlled based upon the overhead data.

19. A method of storing data to an optical disc comprising:
generating encoded data that includes a payload data block and overhead data to be stored on the optical disc, wherein the overhead data is (i) used by one or more components of a disc writing system to write the encoded data to the optical disc and (ii) used by one or more components of a disc reading system to read the encoded data from the optical disc using instructions generated based upon a key, wherein it is infeasible to convert an analog read signal recovered from the optical disc into encoded digital data without the key; and
generating the overhead data according to the key, wherein automatic gain control is adjusted based upon the overhead data.

* * * * *